United States Patent [19]

Miller et al.

[11] Patent Number: 6,068,876

[45] Date of Patent: May 30, 2000

[54] MESOPHASE-STABILIZED EMULSIONS AND DISPERSIONS FOR USE IN LOW-FAT AND FAT-FREE FOOD PRODUCTS

[75] Inventors: Miranda Miller, Arlington Heights; Ahmad Akashe, Mundelein; Dhruba Das, Arlington Heights, all of Ill.

[73] Assignee: Kraft Foods, Inc., Northfield, Ill.

[21] Appl. No.: 09/258,987

[22] Filed: Feb. 26, 1999

[51] Int. Cl.[7] .................................................. A23L 1/035
[52] U.S. Cl. .......................... 426/604; 426/602; 252/302
[58] Field of Search .................................. 426/653, 601, 426/602, 604; 514/936; 252/302

[56] References Cited

U.S. PATENT DOCUMENTS

| | | | |
|---|---|---|---|
| 3,924,018 | 12/1975 | Sims et al. | 426/564 |
| 3,928,648 | 12/1975 | Stahl et al. | 426/564 |
| 4,242,364 | 12/1980 | Buddemeyer et al. | 426/98 |
| 4,483,880 | 11/1984 | Kouzumi | 426/549 |
| 4,664,932 | 5/1987 | Yamaguchi | 426/653 |
| 4,680,184 | 7/1987 | Seiden | 426/654 |
| 4,826,699 | 5/1989 | Soe | 426/564 |
| 5,011,701 | 4/1991 | Baer et al. | 426/573 |
| 5,106,644 | 4/1992 | El-Nokaly | 426/603 |
| 5,254,356 | 10/1993 | Busken | 426/604 |
| 5,472,728 | 12/1995 | Miller et al. | 426/601 |
| 5,534,285 | 7/1996 | Setser | 426/549 |
| 5,554,407 | 9/1996 | Bodor et al. | 426/603 |
| 5,620,734 | 4/1997 | Wesdorp et al. | 426/601 |
| 5,626,903 | 5/1997 | Gautchier | 426/611 |
| 5,652,011 | 7/1997 | Heertje et al. | 426/601 |
| 5,656,323 | 8/1997 | Underdown | 426/603 |
| 5,736,177 | 4/1998 | McGinley et al. | 426/98 |
| 5,939,128 | 8/1999 | Kleinherenbrink | 426/611 |
| 5,968,583 | 10/1999 | Gautchier | 426/611 |
| 5,989,603 | 11/1999 | Lonergan | 426/94 |

FOREIGN PATENT DOCUMENTS

| | | |
|---|---|---|
| 1180250 | 1/1985 | Canada . |
| 0 547 647 A1 | 6/1993 | European Pat. Off. . |
| WO 94/07377 | 4/1994 | European Pat. Off. . |
| 0 558 523 B1 | 7/1994 | European Pat. Off. . |
| WO91/18514 | 12/1991 | WIPO . |
| WO92/09209 | 6/1992 | WIPO . |
| WO94/14338 | 7/1994 | WIPO . |
| WO97/26296 | 7/1997 | WIPO . |

OTHER PUBLICATIONS

Brunsma 1984 Cereal Chemistry 61(4)279–281.
Hartnett 1980 Cake Emulsifiers American Institute of Baking vol. II, Issue 1.
Krog 1976 Food Emulsifiers and Their Associations with Water, Chapter 3 in Food Emulsions Ed by Sty Friberg Marcel Dekker Inc New York p. 67–135.
Abstract of *Bailey's Industrial Oil and Fat Products*, vol. 3, pp. 482–522, 1996.
"Reduction of Serum Cholesterol with Sitostanol–Ester Margarine in a Mildly Hypercholesterolemic Population", Tatu A. Mietten, M.D., Pekka Puska, M.D., Helena Cylling, M.D., Hannu Vanhanen, M.D. and Erkki Vartianen, M.D., *The New England Journal of Medicine*, vol. 333, No. 20, Nov. 16, 1995, pp. 1308–1312.

*Primary Examiner*—Carolyn Paden
*Attorney, Agent, or Firm*—Fitch, Even, Tabin & Flannery

[57] ABSTRACT

Mouthfeel enhancing and emulsion- and dispersion-stabilizing compositions which are utilized in low-fat and fat-free food products and methods for preparing them are described. The mesophase-stabilized emulsions and dispersions are prepared using three different emulsifiers. More specifically, the three emulsifier mixture is formed using about 1 to about 40 percent of a first emulsifier which has an HLB of about 6 to about 9, about 20 to about 60 percent of a second emulsifier which has an HLB of 2 to about 6, and about 10 to about 60 percent of a third emulsifier which has an HLB of about 9 to about 22. The mesophase-stabilized emulsions and dispersions are highly stable and convey advantageous mouthfeel and flavor characteristics to the food products they are used in.

30 Claims, No Drawings

MESOPHASE-STABILIZED EMULSIONS AND DISPERSIONS FOR USE IN LOW-FAT AND FAT-FREE FOOD PRODUCTS

FIELD OF THE INVENTION

The present invention generally relates to low-fat and fat-free food products. More particularly, the present invention relates to mouthfeel-enhancing, texture-building and emulsion-stabilizing compositions which are mesophase-stabilized emulsions and dispersions for use in low-fat and fat-free food products.

BACKGROUND OF THE INVENTION

In recent years, many efforts have been made to reduce the fat content of various foods, such as salad dressing, sour cream and frozen desserts. When the fat level is reduced in conventional food products, however, the organoleptic properties are generally adversely affected because of the oiliness (lubricity) and slipperiness imparted by the fat particles suspended in the food product are removed.

Other mouthfeel and textural properties such as richness and creaminess may also be adversely affected by removal or reduction of fat. Polysaccharide and protein ingredients commonly known as fat mimetics have been used to restore some of the textural properties contributed by emulsified fats and oils, such as viscosity and gel strength. They have been used less successfully with respect to the more subtle mouthfeel factors. In addition, many of these ingredients have negative impact on flavor.

The FDA Standards of Identity recognize "reduced fat" foods as foods that have 25% less fat than the market standard of a full-fat counterpart of that food type. "Light" products retain 50% less fat than the market standard of a full-fat counterpart of that food type. "Low-fat" foods are defined as having less than 3 grams of fat per serving, and "fat-free" foods have less than ½ gram fat per serving. For purposes of this disclosure, the term "low-fat" is intended to include all of the above and will be used to describe the food products into which the present composition may be incorporated. In this disclosure, "low fat" is meant to include "reduced fat," "light," "low fat," and "fat-free" as defined by the FDA Standards of Identity for the sake of conciseness. However, the term "fat-free" is intended to include only "fat-free" as defined by the FDA Standards of Identity. In addition, the present invention is meant to include reduced-fat and fat-free food products that do not fall into the categories defined by the FDA Standards of Identity (as of the time of this disclosure), but deliver to the consumer reduced levels of fat per serving of a type of food.

As noted above, reduced-fat, light, low-fat and fat-free food products have been developed which duplicate the viscosity and other textural attributes of the missing fat by means of suitable food polymers, such as gums (xanthan or alginate), cellulose and its derivatives, starches and various microparticulated polymeric complexes. Unfortunately, flavor, mouthfeel and thermal factors are often adversely affected as compared to the full fat food products.

Many of these desirable attributes in full fat products are due to the presence of two distinct phases: an aqueous phase and an oil phase. The oil phase provides a reservoir of solvent for the flavor chemicals to dissolve in. By altering the proportions of the two phases, the partitioning of the flavor chemicals between the two phases is changed, affecting the character of the flavor and the way it is released in the mouth. In the extreme example of a fat-free product, the product consists of a single phase, and the flavor chemicals must be, of course, only dispersed in the aqueous phase. Free oil typically contributes to the mouthfeel of full fat products. In the mouth, some free oil separates from the bulk of the product, coats the mouth, and provides oily lubricity. Fats and oils also contribute thermal sensations in the mouth. These effects can be either mouthwarming as a result of the coating of the free oil, or mouthcooling due to melting of any crystalline fat.

The mesophase-stabilized emulsions and mesophase-stabilized dispersions which are provided by the present invention significantly improve the quality of reduced fat, light, low-fat and fat-free food products by providing some of the aforementioned attributes normally associated with full fat products. They do this by providing a separate phase, a mesophase, which is neither an aqueous phase nor an oil phase, but a liquid crystalline phase of both hydrophobic and hydrophilic character. They also provide a way of potentiating or maximizing the oily and fatty attributes of whatever oils or fats exist in the reduced fat, light, low-fat or fat-free product. By light microscopy, the mesophase-stabilized emulsions of this invention contain oil droplets which appear in a narrow range of particle sizes as relatively small-sized oil droplets dispersed in an aqueous gel phase. Upon centrifugation, most of the mesophase-stabilized emulsions of the present invention separate into an oil emulsion and a mesophase gel. In a food product, some of the oil droplets of the emulsion phase release their oil, providing lubricity, flavor delivery, and mouthwarming.

The mesophase gel of this invention provides stability and structure to the food product. Because starch components and other stabilizing or thickening agents are not required to structure the food product, maximum oily mouthfeel and flavor characteristics are retained. In fact, any fats or oils present in the mesophase-stabilized emulsions or mesophase-stabilized dispersions are potentiated by the present invention. The present invention represents a new method for making low-fat and fat-free food products by allowing highly viscous emulsions to be made regardless of the oil level, with no requirement for polymeric protein or polysaccharide thickening or bulking ingredients.

It is an object of the invention to provide mesophase-stabilized compositions for use in low-fat and fat-free food products which are superior to conventional low-fat and fat-free food products in the mouthfeel and textural properties which are experienced when consuming such food products. The attributes provided by the compositions of the invention are significantly better as compared to conventional low-fat and fat-free food products with regard to mouthfeel, flavor and textural factors.

It is an additional object of the invention to provide methods for making such mesophase-stabilized compositions for use in low-fat and fat-free food products. Food products containing these mesophase-stabilized compositions are superior to conventional low-fat and fat-free food products in mouthfeel, flavor and textural factors.

SUMMARY OF THE INVENTION

Mesophase-stabilized emulsion compositions for use in low-fat food products and mesophase-stabilized dispersions for use in fat-free food products are provided. The mesophase-stabilized emulsions or dispersions are prepared using three emulsifiers. The first emulsifier has an intermediate hydrophilic/lipophilic balance (HLB) (i.e., an HLB of about 6 to about 9). The second emulsifier has a relatively low HLB (i.e., an HLB of about 2 to about 6). The third has a high HLB (i.e., an HLB of about 9 to about 22). The mesophase-stabilized emulsions and dispersions are highly viscous, even at low oil levels, and in the absence of polymeric protein or polysaccharide thickening or bulking ingredients. The mesophase-stabilized emulsions and dispersions can be used to formulate stable, viscous food products having excellent lubricity, mouthfeel and flavor characteristics. These mesophase-stabilized emulsions are especially useful in low-fat food products. In addition, the mesophase-stabilized dispersions are especially useful in fat-free food prodicts. The food products generated using the mesophase-stabilized compositions of the present invention are advantageous in comparison to conventional low-fat and fat-free food products. This is because the functional aspects such as mouthfeel, flavor and lubricity delivered by food products made with the compositions of the present invention are superior to those delivered by conventional low-fat and fat-free food products.

The present invention is a mesophase-stabilized composition for use in low-fat and fat-free food products including an emulsifier mixture and an aqueous phase; wherein the emulsifier mixture comprises about 1 to about 40 percent of a first emulsifier which has an HLB of between about 6 and about 9, about 20 to about 60 percent of a second emulsifier which has an HLB of between about 2 and about 6, and about 10 to about 60 percent of a third emulsifier which has an HLB of between about 9 and about 22.

The present invention provides a method for making a mesophase-stabilized composition for use in low-fat or fat-free food products, said method comprising the steps of, in order, (a) heating an aqueous emulsifier phase to about 45° C. to about 90° C., wherein the aqueous emulsifier phase comprises an emulsifier mixture added to an aqueous phase, wherein the emulsifier mixture includes about 1 to about 40 percent of a first emulsifier which has an HLB of between about 6 and about 9, about 20 to about 60 percent of a second emulsifier which has an HLB of between about 2 and about 6, and about 10 to about 60 percent of a third emulsifier which has an HLB of between about 9 and about 22 (b) cooling the aqueous emulsifier phase to a range of temperatures between about 40° C. to about 60° C.; and (c) further cooling the aqueous emulsifier phase to between about 2° to about 8° C. to form a mesophase-stabilized dispersion.

The present invention is a mesophase-stabilized composition for use in low-fat food products comprising an emulsifier composition, an oil phase and an aqueous phase; wherein the emulsifier composition includes about 1 to about 40 percent of a first emulsifier which has an HLB of about 6 to about 9, about 20 to about 60 percent of a second emulsifier which has an HLB of about 2 to about 6, and about 10 to about 60 percent of a third emulsifier which has an HLB of about 9 to about 22.

The present invention provides a method for making a mesophase-stabilized composition for use in low-fat food products, said method comprising the steps of (a) adding a first emulsifier which has an HLB of about 6 to about 9 and a second emulsifier which has an HLB of about 2 to 6 to an oil phase and mixing with heat to form an oil emulsifier phase; (b) adding a third emulsifier which has an HLB of about 9 to about 22 to an aqueous phase and mixing to form an aqueous emulsifier phase; (c) mixing the oil emulsifier phase and the aqueous emulsifier phase to form a coarse emulsion; (d) subjecting the coarse emulsion to shear in a range of about 5000 sec$^{-1}$ to about 50,000 sec$^{-1}$ to form a mesophase-stabilized emulsion; and (e) cooling the mesophase-stabilized emulsifier to a temperature between about 2° C. and to about 10° C.; wherein the mesophase-stabilized composition contains, based in the total weight of the first, second and third emulsifiers, about 1 to about 40 percent of the first emulsifier, about 20 to about 60 percent of the second emulsifier, and about 10 to about 60 percent of the third emulsifier.

The present invention provides a mesophase-stabilized composition for use in low-fat food products, said method comprising an emulsifier mixture, an oil phase and an aqueous phase, made by the method comprising the steps in order (a) heating an aqueous emulsifier phase to be between 45° C. to about 90° C., wherein the aqueous emulsifier phase comprises an emulsifier mixture added to an aqueous phase, wherein the emulsifier mixture comprises about 1 to about 40 percent of a first emulsifier which has an HLB of between about 6 and about 9, about 20 to about 60 percent of a second emulsifier which has an HLB of between about 2 and about 6, and about 10 to about 60 percent of a third emulsifier which has an HLB of between about 9 and about 22; (b) cooling the aqueous emulsifier phase to a temperature of between about 40° C. to about 60° C.; (c) adding an oil phase, a spice, a preservative, and another food ingredient with mixing to form a coarse emulsion; (d) subjecting the coarse emulsion to shear ranging from about 5,000 sec$^{-1}$ to about 50,000 sec$^{-1}$ to yield a mesophase-stabilized composition; and (e) cooling the mesophase-stabilized composition to a temperature between about 2° C. to about 10° C.

DETAILED DESCRIPTION OF THE INVENTION

Generally, the present invention is directed to mesophase-stabilized emulsions for use in low-fat food products and methods for making such emulsions. In addition, the invention is directed to mesophase-stabilized dispersions for use in fat-free food products and methods for making such dispersions. Such food products include pourable dressings, spoonable dressings, whipped desserts, whipped toppings, frozen dairy foods, dips, sauces, yogurts, dessert toppings, spreads, sour cream products, cream cheese products, processed cheese products and the like. In one embodiment of the invention, the composition is a mesophase-stabilized emulsion including several emulsifiers, an oil phase and an aqueous phase. In this embodiment of the invention, the method for making such a mesophase-stabilized emulsion includes adding a first emulsifier in which has an HLB of about 6 to about 9 and a second emulsifier which has an HLB of about 2 to about 6 to an oil phase, which is then heated to permit the emulsifiers to melt and dissolve, to form an oil emulsifier phase, and adding, a third emulsifier of HLB of about 9 to about 22 to an aqueous phase to form an aqueous emulsifier phase. As discussed below, although it is not required, it is preferable for certain applications (or types of food products) that the emulsifiers are added in dry powder form. The oil emulsifier phase is then mixed with the aqueous emulsifier phase, subjected to shear, and permitted to cool. This process results in a mesophase-stabilized emulsion which is useful in the manufacture of low-fat food products. In an important embodiment of the invention the first emulsifier is a diacetyl tartaric acid ester of monoglyceride (DATEM), the second emulsifier is a monoglyceride, and the third emulsifier is sodium stearoyl lactate.

In another embodiment of the invention, a mesophase gel is formed using the three emulsifiers dispersed in an aqueous phase. This mesophase gel or mesophase-stabilized dispersion may be used to form fat-free food products by the addition of ingredients other than oil such as egg product, salt, sugar and an edible acid, resulting in mesophase-stabilized fat-free food products. The egg product used in any of the mesophase-stabilized compositions of the invention may be egg yolk, salted egg yolk, whole eggs, liquid egg product, spray-dried egg yolk, spray dried whole egg, or any other form of egg product. Alternatively, this mesophase gel may be used to form a mesophase-stabilized emulsion by adding an oil phase with shear to the mesophase gel to form a mesophase-stabilized emulsion. To produce a spoonable dressing product from such a mesophase-stabilized emulsion, egg product, salt, sugar and an edible acid are added with mixing. The resulting food product is stable at room temperature.

Mixtures of emulsifiers and water can form a number of different physical structures depending on the emulsifier to water ratio, the type of emulsifier, the ratio of different emulsifiers, temperature, the order of addition of components and process factors such as shear rate. Such mixtures are generally opalescent dispersions referred to as liquid crystals or mesophases. A mesophase is a structure that may be manifested in several forms such as lamellar, vesicular, cubic and hexagonal forms, depending upon the emulsifiers used, the emulsifier to water ratio, and the process conditions used. These mesophase structures are described in *Bailey's Industrial Oil and Fat Products*, Vol. 3, pages 499–502 (1996). An emulsifier such as a diacetyl tartaric ester of monoglyceride, when dispersed in water, crystallizes in bilayers, with the thickness of each bilayer defined by the length of the two monoglyceride molecules oriented end to end. When heated in water, the fatty acid chains gain thermal mobility and lose their ordered structure, and the water solvent can intrude between the bilayers. Under proper conditions of temperature and solvent content, this intrusion results in the formation of a lamellar mesophase. At higher water levels and within certain temperature ranges, the lamellar mesophase may be transformed into spherical multilamellar vesicles or liposomes. Such an aqueous solution of emulsifier(s) dissolved in water is known as a mesophase gel.

The inclusion of oil with emulsifier(s) dispersed in the oil phase, and subsequent addition of an aqueous phase with dispersed emulsifier(s) to that oil phase, when subjected to shear, will result in a mesophase dispersed in an emulsion. The present invention includes emulsions stabilized by mesophases dispersed therein. Some of the compositions disclosed herein are thus mesophases dispersed within oil-in-water emulsions, and are, in fact, mesophase-stabilized emulsions. Alternatively, the inclusion of non-oil ingredients in a mesophase gel, such as edible acids, flavorings, egg products, and the like, result in dispersions within the mesophase. Such mesophase-stabilized dispersions may be utilized to produce fat-free food products.

It is useful to classify emulsifiers according to their stabilizing efficiency for a particular type of emulsion. A well established empirical procedure for doing this is the hydrophile-lipophile balance (HLB) method of W. C. Griffin, *J. Soc. Cosmetic Chem.*, 1, 311 (1949). For a given oil and water system, there is an optimum balance between molecular hydrophilic and lipophilic character which leads to maximum emulsification efficiency. Emulsifiers with low HLB numbers (i.e., in the range of 2–6) are suitable for preparing water-in-oil emulsions, while those with high HLB numbers (i.e., in the range of 9–22) are suitable for oil-in-water emulsions. Emulsifiers with intermediate or medium HLB numbers (i.e., in the range of 6–9) are suitable for either type of emulsion depending upon ratio of oil and water, temperature and other conditions. HLB values for a given emulsifier may be determined experimentally by the method originally described by Griffin, or empirically using the formula of J. T. Davies, *Proc. 2nd Int. Cong. Surface Activity*, Vol. 1, p. 426 (1957).

$$HLB = 7 + \sum_i n_H(i) - \sum_j n_L(j)$$

where $n_H(i)$ and $n_L(j)$ are empirically-derived individual group numbers for the hydrophilic groups (i) and lipophilic groups (j) assigned by Davies.

Using the empirical method with the above equation, calculated HLB values for specific, and indeed preferred, emulsifiers useful in this invention are as follows: diacetyl tartaric acid monostearate glyceride (DATEM), HLB 8; monoglyceride (MG), HLB 3; sucrose monostearate (SMS), HLB 16; and sodium stearoyl lactylate (SSL), HLB 21. It should be noted that group numbers for charged residues depend on the ionic strength of the aqueous phase. Therefore, although the calculated HLB value for sodium stearoyl lactylate is 21, an experimentally derived HLB value would be closer to 12; of course, sodium stearoyl lactylate would be classified as a high HLB emulsifier whichever value is used.

Key considerations for the fatty acid ester substituent of the emulsifier components are melting point and crystallization characteristics. Saturated and trans unsaturated fatty acids are suitable for use in this invention since they have high melting points and form suitable crystals, which retain the lamellar nature of the mesophase complex needed for this invention. Typical cis unsaturated fatty acids have very low melting points and would therefore be unsuitable for most applications of this invention. Such cis unsaturated fatty acids may, in some case, disrupt the crystal packing and destroy the lamellar nature of the mesophase complexes. In such cases, handling and storing the mesophase compositions at relatively low temperatures (i.e., at 0° C. or less) will avoid such problems. These mesophases would be suitable for frozen products.

The mesophase compositions of the present invention contain three types of emulsifiers which are co-crystallized into a mesophase complex. It has been determined that the combination of these three types of emulsifiers yield mesophase-stabilized compositions that are superior in functional attributes and stability to mesophase-stabilized compositions incorporating only two emulsifiers. The preparation of mesomorphic phases for use in food products has been described, for example, in U.S. Pat. No. 5,652,011 and European Patent Publication EP 0 558 523 B2. However, those publications describe the primary use of two emulsifiers; moreover, the ratios of emulsifiers are very different from those used in the present invention.

Typically, the first emulsifier has an HLB in the range of between about 6 and about 9. The fatty acid of the first emulsifier is selected from the group consisting of saturated and unsaturated $C_6$–$C_{22}$ fatty acids. Preferred saturated fatty acids are stearic acid and palmitic acid. Preferred unsaturated fatty acids are long chain ($C_{16}$–$C_{22}$) trans unsaturated fatty acids. The second emulsifier has an HLB in the range of between about 2 and 6, and is preferably a monoglyceride. The fatty acid of the monoglyceride is also selected from the group consisting of saturated and unsaturated $C_6$–$C_{22}$ trans fatty acids. The preferred saturated fatty acids for the monoglyceride are stearic acid and palmitic acid. Preferred unsaturated fatty acids are long chain ($C_{16}$–$C_{22}$) trans saturated fatty acids. The third emulsifier has an HLB in the range of between about 9 and 22. The fatty acid components of these are selected from the group consisting of saturated and unsaturated $C_6$–$C_{22}$ fatty acids. Preferred saturated fatty acids are stearic acid and palmitic acid. Preferred unsaturated fatty acids are long chain ($C_{16}$–$C_{22}$) trans unsaturated fatty acids.

Key considerations in selection of fatty acids are the melting point and crystallization characteristics of the fatty acid esters. The preferred fatty acids all result in esters which have melting points above about 37° C. Thus, these emulsifiers can be added in powder form to the liquid phases. These fatty acids easily crystallize upon cooling to temperatures below their melting point. With such characteristics, the lamellar nature of the mesophase gels, mesophase-stabilized emulsions and mesophase-stabilized dispersions of the present invention are stabilized upon cooling.

Typical cis unsaturated fatty acids have very low melting points and would generally therefore be unsuitable for most applications of this invention. Furthermore, if cis unsaturated fatty acids with very low melting points were used, they would be expected to disrupt the crystal packing and destroy the lamellar nature of the trans mesophase complexes needed for this invention to be effective as a mesophase-stabilized emulsion unless handled and stored at relatively low temperatures. However, for some applications, it is possible to utilize lower melting point emulsifiers. The result, however, of using such emulsifiers would be disorganization of the liquid crystalline or lamellar structure at, for instance, room temperature. While such emulsifiers are not desirable for the use in mesophase-stabilized food products which are stored above about 0° C., they would be acceptable for use in products such as low-fat or fat-free frozen desserts, frozen dairy foods, and frozen whipped toppings.

To prepare the mesophase-stabilized emulsions of the present invention, three emulsifiers are used. While mesophase-stabilized emulsions can be made using two emulsifiers, such emulsions do not possess the degree of positive functional attributes such as stability, lubricity, mouthfeel and flavor delivery as the mesophase-stabilized emulsions generated using three emulsifiers of the present disclosure. The particular emulsifiers used, the ratios of the emulsifiers, as well as other factors, give rise to the variety of characteristics possessed by the mesophase-stabilized emulsions and mesophase-stabilized dispersions of the invention described herein. The Examples illustrate how variations in the particular emulsifiers used, their ratios, and other factors can be altered to yield mesophase-stabilized emulsions and mesophase-stabilized dispersions for use in low-fat and fat-free food products that have desirable characteristics.

The first emulsifier has an intermediate HLB number ranging from about 6 to about 9. Examples of such emulsifiers include, but are not limited to, a diacetyl tartaric acid ester of monoglyceride (DATEM), sorbitan monopalmitate, sorbitan monolaurate, and polyoxyethylene stearic acid monoester. Preferably, the first emulsifier is DATEM. The second emulsifier has a low HLB number, i.e., in the range of about 2 to about 6. Examples of such emulsifiers include, but are not limited to, monoglyceride, glycerol monostearate, sucrose distearate, sorbitan monostearate, glycerol monolaurate, and ethylene glycol monostearate. Preferably, the second emulsifier is monoglyceride. The third emulsifier is an emulsifier with a high HLB number, in the range from about 9 to about 22. Examples of such emulsifiers include, but are not limited to, sucrose monostearate, sodium stearoyl lactylate, sucrose monolaurate, polyoxyethylene sorbitan monopalmitate, or polyoxyethylene stearic acid monoester. Preferably the third emulsifier is sodium stearoyl lactylate.

Oils that can be used in the present invention are edible oils, such as vegetable oil, olive oil, corn oil, soybean oil, canola oil, sunflower seed oil, peanut oil, sucrose fatty acid polyesters, and the like. Other edible oils may also be used. A single oil or combinations of the edible oils may be used.

The edible acid may be any edible acid, such as vinegar, lemon juice, lime juice, acetic acid, phosphoric acid, lactic acid, citric acid and the like, or combinations of edible acids.

Centrifugation of conventional (i.e., non-mesophase-stabilized) low-fat emulsions will cause flocculation of the oil droplets and coalescence which will generally cause the emulsions to break (i.e., forming an oil phase upper layer and an aqueous phase lower layer with a clear interface between the two phases). Likewise, long-term storage of a conventional low-fat emulsion will often result in the separation of an aqueous phase and an oil phase adjacent to remaining emulsion. In contrast, the mesophase-stabilized emulsions described herein are very stable when subjected to harsh treatment (e.g., centrifugation) or when stored for long periods of time. In other words, the mesophase-stabilized emulsions of the present invention are significantly more stable than conventional low-fat emulsions (i.e., non-mesophase-stabilized low-fat emulsions).

In some instances, the mesophase-stabilized emulsions of the present invention separate into an oil emulsion and a mesophase gel under harsh centrifugation conditions. Nonetheless, these mesophase-stabilized emulsions are still advantageous with respect to stability as compared to foods prepared with low-fat emulsions that have been stabilized with starches or other polysaccharides. Where a mesophase gel is formed upon centrifugation, the use of certain emulsifier ratios, oil to water ratios, temperatures, order of addition of components and different process conditions, are some of the factors that control whether the mesophase gel is stable. This stability is indicated by little or no water separating from the gel. Likewise, in instances in which the mesophase-stabilized emulsions of this disclosure may separate into an oil emulsion and a mesophase gel under harsh centrifugation conditions, the oil emulsion which separates from the mesophase gel generally remain stable. Thus, little or no oil is released from the oil emulsion upon centrifugation.

Factors such as oil to emulsifier ratio, water to emulsifier ratio, oil to water ratio, temperature, specific emulsifiers used and their ratios, the order of addition of components and the phase in which each emulsifier is dispersed (i.e., dispersion of the intermediate HLB emulsifier and low HLB emulsifier in oil or water, dispersion of the high HLB emulsifier in water) and process factors such as shear, appear to control the stability of the mesophase-stabilized emulsions generated as described herein. The formulation of several mesophase-stabilized emulsions and their characteristics upon formation and upon centrifugation are set forth in Example 2. As shown in Example 2, some mesophase-stabilized emulsions remain as a mesophase-stabilized emulsion under centrifugation conditions. Others form relatively stable oil emulsions. Others form relatively stable mesophase gels upon centrifugation treatment.

In addition to centrifugation analysis discussed above, light microscopy can be used to evaluate the relative stability of the mesophase-stabilized emulsions described herein. Using light microscopy, relatively small oil droplets in a narrow size distribution is indicative of a stable emulsion where the oil is relatively evenly dispersed in the aqueous phase of the oil-in-water emulsion. Such an emulsion is less likely to break and form an oil phase and an aqueous phase under centrifugation or long term storage.

The mesophase-stabilized emulsions formed of three emulsifiers often show storage stability at room temperature (see Examples 1 and 2) for at least one year. Thus, the use of mesophase-stabilized emulsions should provide a longer shelf life for low-fat food products in which they are incorporated. Thus, the present mesophase-stabilized emulsions and/or mesophase-stabilized dispersions represent a considerable advantage over conventional low-fat emulsions which have not been stabilized.

Other characteristics of the composition of the present invention have been evaluated. The mesophase-stabilized emulsions of the invention have been tested Theologically to determine yield stress in τ[Pa]. Measurements of yield stress may be made with conventional instruments such as, for example, a Haake VT 550 (Haake, Karlsruhe, Germany). Yield stress is an indicator of the degree of gelation of the emulsion. Intuitively, it is desirable to have relatively higher yield stress characteristics for food products such as spoonable dressings, whipped toppings, whipped desserts, sour cream products, cream cheese products, spreads and the like, and relatively low values for pourable dressings, sauces and the like. In Example 2, the yield stress of the different formulations of mesophase-stabilized emulsion was observed prior to centrifugation. For instance, the desired yield stress characteristics for cream cheese products, spreads and the like, appears to be from about 800 to about 2000 τ[Pa] and more preferably from about 1200 to about 1600 τ[Pa]. The desired yield stress characteristics for spoonable dressings, whipped toppings, whipped desserts, sour cream products and the like appears to be from about 180–260 τ[Pa], and more preferably about 200–240 τ[Pa]. In contrast, sauces, pourable dressings and the like would preferably have a yield stress of about 80–150 τ[Pa], and more preferably about 100–120 τ[Pa].

The viscosities of the different formulations in the Examples were measured with a Bohlin Visco 88 viscometer at 50 sec$^{-1}$ (Bohlin, Lund, Sweden). For spoonable dressings, whipped toppings, whipped desserts, sour cream products and the like, the preferred viscosity would be between about 4.0 and about 6.0 Pas and more preferably, between about 4.4 and about 5.6 Pas. For a pourable dressing or sauce, the preferred viscosity would be between about 0.5 and about 2.0 Pas and more preferably, between about 0.8 and about 1.4 Pas.

The oil to emulsifier ratio, water to emulsifier ratio, oil to water ratio, temperature, order of addition of components, phase in which they are dispersed (i.e., dispersion of DATEM and monoglyceride in oil or water, SSL in water), process factors such as shear, the specific emulsifiers used and their ratios, are factors that can be controlled to result in emulsions or dispersions which, when combined with other food product components, yield desirable product characteristics. The Tables in Example 2 provide data regarding the variety of the parameters. Thus, one or more preferred formulations from these Tables (as well as the other Examples) may be identified to be useful for a number of applications. Of course, it is within the skill of the art to vary other parameters, using the guidelines provided by the present specification to determine the appropriate conditions or parameters for a particular application.

Generally, preferred ranges of emulsifiers (and the ratios which can be derived from them) which yield the best characteristics for a particular product application (i.e., spoonable dressings or, alternatively, pourable dressings) have been investigated. To prepare an emulsion or dispersion for use in a spoonable dressing, for instance, the ranges of emulsifiers are preferably from about 20 to about 40 percent DATEM, from about 40 to about 60 percent monoglyceride and from about 10 to about 30 percent SSL. To prepare an emulsion or dispersion for use in a sour cream product, for instance, the ranges of emulsifiers are preferably about 20 to about 40 percent DATEM, about 20 to about 40 percent monoglyceride and about 30 to about 50 percent SSL. For a pourable dressing with acceptable aqueous stability, for example, the ranges of emulsifiers are preferably from about 1 to about 25 percent DATEM, from about 20 to about 50 percent monoglyceride, and from about 40 to about 60 percent SSL.

In one embodiment of the invention, the first emulsifier, preferably in dry powder form, and the second emulsifier, preferably in dry powder form, are dispersed in the oil phase at room temperature, then heated to between about 80° C. and about 100° C. More preferably, the oil phase is heated to between about 85° C. and about 95° C.; most preferably, the oil phase is heated to about 90° C. The third emulsifier, preferably in dry powder form, is dispersed in room temperature water. The hot oil phase is then poured slowly into the aqueous phase while mixing, producing a mixture or a coarse emulsion. The coarse emulsion is cooled and maintained at a temperature of between about 40° C. and about 55° C. and preferably at between about 45° C. and about 50° C. The coarse emulsion is then homogenized through a moderate to high shear device. Moderate to high shear is defined here as being between about 5000 sec$^{-1}$ and about 50,000 sec$^{-1}$. Preferably, the level of shear used is between about 15,000 sec$^{-1}$ and about 25,000 sec$^{-1}$. The consistency of a mesophase-stabilized emulsion generated in this manner and containing about 6% total emulsifier and about 30% oil is that of heavy cream at about 45° C. to 50° C. The resulting mesophase-stabilized emulsion is then stored at refrigeration temperature (i.e., about 2° C. to about 8° C. and, preferably, about 5° C. to about 6° C.). After overnight storage at refrigeration temperature, the mesophase-stabilized emulsion sells up to a consistency of sour cream. Of course, other methods for cooling the mesophase-stabilized emulsion can be used. For example, the emulsion may be cooled to refrigeration temperature in a heat exchanger, which results in rapid production (generally within 2–20 minutes) of a product with the consistency of sour cream.

In another embodiment of the invention, the three emulsifiers are preferably blended together and added to an aqueous phase. If the first, second and third emulsifiers are added individually to the aqueous phase, the mixture does not form a mesophase gel. Preferably the blend of emulsifiers is in a dry powder form. If desired, an emulsifier with a relatively low melting point may be frozen and ground to a powder while frozen. The mixture of emulsifiers is added to the aqueous phase at a level from about 1% to about 15% of the mesophase-stabilized composition and then dispersed at room temperature with stirring. The aqueous solution with dispersed emulsifiers is then heated to above the melting temperatures of the emulsifiers, preferably to about 70° C. to about 90° C., while stirring and held at that temperature with stirring for several minutes. The mixture is then cooled to about 40° C. to about 50° C. to form the mesophase gel. The mesophase gel is then set by cooling at refrigeration temperatures for several hours (i.e., about 2° C. to about 8° C. and preferably, about 5° C. to about 6° C.) to allow complete formation of the liquid crystalline mesophase. Alternatively, the mesophase gel may be set rapidly by cooling while passing the gel through a heat exchanger.

This mesophase gel can be used to generate a mesophase-stabilized emulsion by adding oil to the gel and then processing in a conventional food processor (i.e., a Cuisinart®) operating at a medium to high speed. Alternatively, the mesophase gel may be used to generate a mesophase-stabilized emulsion by processing the gel and added oil in a rotor-stator shear device such as that which would be found in a food plant. Other devices which may be used to deliver moderate to high shear to form mesophase-stabilized emulsions which are some of the embodiments of this invention include, but are not limited to, colloid mills, homogenizers, Pentax™ KMF-15 (Bran-Luebbe, Buffalo Grove, Ill.), Ross™ mixer (Charles Ross & Sons, Co., Hauppauge, N.Y.), Oakes™ Mixer (Oakes, Hauppauge, N.Y.), or Hydroshear™ (APV Gaulin, Wilmington, Mass.). A moderate to high shear rate is defined herein as a range from about 5000 $\sec^{-1}$ to about 50,000 $\sec^{-1}$.

Oil is gradually added to the mesophase gel with moderate shear and a mesophase-stabilized emulsion is formed. The formation of the mesophase-stabilized emulsion of this embodiment may take place at temperatures ranging between about 5° C. and 50° C. The mesophase-stabilized emulsion has the consistency of a spoonable dressing. Salt, sugar and an edible acid (and, optionally, egg product) may be added to make a low-fat spoonable dressing. The resulting product has the desired consistency of a spoonable dressing and appears to be stable. No synthesis or oil separation is observed for up to two months when stored in a closed jar at room temperature.

Alternatively, the mesophase gel prepared as described herein may be used in the preparation of fat-free food products. To this end, flavorings, dairy products, egg products, an edible acid and/or other food components may be added to the gel with shear ranging from about 5000 $\sec^{-1}$ to about 50,000 $\sec^{-1}$ to produce a variety of fat-free food products.

The Examples that follow are intended to illustrate, and not to limit, the invention. The mesophase-stabilized emulsions and mesophase-stabilized dispersions of the present disclosure may be used to generate a variety of low-fat products (e.g., spoonable dressings, pourable dressings, sauces, whipped toppings, whipped desserts, cream cheese products, dips, yogurts, spreads, sour cream products, frozen desserts, frozen dairy products, and the like). All percentages used herein are by weight, unless otherwise indicated. All references cited in the present specification are incorporated by reference.

In the following Examples, the first emulsifier is a 70/30 mixture of DATEM and monoglyceride (MG). Often the second emulsifier is distilled monoglyceride. For purposes of this invention, the DATEM/MG blend is considered to be a single emulsifier. If desired, the amount of distilled MG could be corrected to take into account the MG present in the DATEM/MG blend.

EXAMPLE 1

Comparison of Two-Emulsifier and Three-Emulsifier Component Mesophase-Stabilized Emulsions.

Mesophase-stabilized emulsions were made with both two and three emulsifiers. The two-emulsifier system (Emulsions 1 and 2) contained a DATEM/MG 70:30 blend with either monoglyceride (MG, a low HLB emulsifier) or sucrose monostearate (SMS, a high HLB emulsifier). The three-emulsifier system (Emulsions 3 and 4) contained DATEM/MG 70:30 blend, MG, and an additional high HLB emulsifier (either sodium stearoyl lactylate (SSL) or sucrose monostearate (SMS)). In all cases, stearate was the major fatty acyl group associated with the emulsifiers. Soybean oil (SBO) was used for all emulsions.

| Component | Emulsion 1 | Emulsion 2 | Emulsion 3 | Emulsion 4 |
|---|---|---|---|---|
| SBO | 47% | 47% | 47% | 47% |
| $H_2O$ | 47% | 47% | 48.5% | 48.5% |
| DATEM/MG (70/30) | 3% | 3% | 1.5% | 1.5% |
| MG | 3% | 0% | 1.5% | 1.5% |
| SMS | 0% | 3% | 1.5% | 0% |
| SSL | 0% | 0% | 0% | 1.5% |

The emulsions were made according to the following procedure. The medium and low HLB emulsifiers (DATEM/MG and MG) were dispersed in SBO. The oil mixture was heated to about 90° C. to melt the emulsifiers. The high HLB emulsifiers (SMS or SSL) were dispersed in water at room temperature. The oil phase at 90° C. was mixed into the aqueous phase while stirring with a propeller-type mixer to form a coarse emulsion. The temperature of the coarse emulsion was adjusted to 50° C. The emulsion was given a final homogenization with an Oakes™ Mixer (a rotor/stator type mixer).

Although all emulsions appeared stable by initial visual inspection, light microscopy and centrifugation (100,000×G for 30 min) revealed considerable differences. The microstructure of Emulsion 1 contained pools of free oil trapped in the mesophase gel matrix. The emulsified oil droplets were irregular and heterogeneous in size ranging from about 10 to several hundred microns. Crystalline fat was apparent in the oil droplets. Upon centrifugation, Emulsion 1 broke, releasing free oil. The microstructure of Emulsion 2 was similar to that of Emulsion 1 except that crystalline fat was not apparent in the droplets. Upon centrifugation, Emulsion 2 was very unstable, releasing both free oil and free water.

Emulsions 3 and 4 were significantly more stable than Emulsions 1 and 2. The microstructure of Emulsion 3 showed a uniform, fairly homogeneous dispersion of spherical oil droplets with an average droplet size of about 10 microns. Centrifugation of Emulsion 3 resulted in clear separation of the oil emulsion (top layer) and the mesophase gel (bottom layer). There was only a slight amount of free oil on top of the emulsion (i.e., around the rim of the centrifuge tube). The mesophase gel was also very stable, with a thin layer of free water between the gel and the emulsion, accounting for only a few percent of the total water in the system.

Emulsion 4 had a mean droplet size of about 7 microns. Upon centrifugation, there was clean separation of the oil emulsion layer from the mesophase gel layer. There was no evidence of any free oil on top of the emulsion layer; the emulsion layer had a matte, dry appearance. No water could be seen between the mesophase gel and emulsion layers.

The mesophase-stabilized emulsions prepared using two emulsifiers were relatively unstable. In contrast, the mesophase-stabilized emulsions utilizing three emulsifiers provide in stable emulsions.

EXAMPLE 2

Optimization of Three-Component Mesophase-Stabilized Emulsions.

The combinations and ratios of different emulsifiers and oil to water ratios was evaluated to reveal which formulations yield the most stable emulsions. Mesophase-stabilized emulsions were prepared according to the following procedure using varying amounts of SSL (sodium stearoyl lactylate), MG (distilled monoglyceride), and DATEM (diacetyl tartaric esters of monoglyceride). (The DATEM ingredient was a 70:30 blend of DATEM and MG.) Stearate was the major fatty acyl group in all emulsifiers. SSL was dispersed in water at room temperature. The other emulsifiers (DATEM and/or MG) were dispersed in the oil phase (soybean oil) at room temperature and then heated up to 90° C. The hot oil phase was then poured slowly into the water phase while mixing with a propeller-type mixer to produce a coarse emulsion. The coarse emulsion temperature was maintained at about 45–50° C. The coarse emulsion was then homogenized through a rotor/stator shear device (Pentax Mixer™) (Pentax, Bran and Luebbe, Buffalo Grove, Ill.) and then stored at refrigeration temperature.

Using the above procedure, the samples in Table I were prepared to illustrate the effects of varying oil level, total emulsifiers concentration, and emulsifier ratios. Upon cooling at refrigeration temperatures (i.e., about 2° C. to about 8° C. and preferably, about 5° C. to about 6° C. ), the mesophase-stabilized emulsions were subjected to rheological measurements, centrifugation treatment, and light microscopy studies.

TABLE I

Three-Component Mesophase-Stabilized Emulsions.

| Sample | RATIO OF EMULSIFIERS | | | COMPONENTS (%) | | |
|---|---|---|---|---|---|---|
| | DATEM/MG (70/30) | MG | SSL | % Total Emulsifier | % OIL | % Water |
| 1 | 0 | 0.5 | 0.5 | 3 | 30 | 67 |
| 2 | 0.45 | 0.45 | 0.1 | 3 | 30 | 67 |
| 3 | 0.5 | 0.25 | 0.25 | 3 | 30 | 67 |
| 4 | 0 | 0.5 | 0.5 | 3 | 60 | 37 |
| 5 | 0.45 | 0.45 | 0.1 | 3 | 60 | 37 |
| 6 | 0.25 | 0.25 | 0.5 | 3 | 60 | 37 |
| 7 | 0 | 0.5 | 0.5 | 6 | 30 | 64 |
| 8 | 0.5 | 0.25 | 0.25 | 6 | 30 | 64 |
| 9 | 0.25 | 0.5 | 0.25 | 6 | 30 | 64 |
| 10 | 0 | 0.5 | 0.5 | 6 | 60 | 34 |
| 11 | 0.45 | 0.45 | 0.1 | 6 | 60 | 34 |
| 12 | 0.25 | 0.5 | 0.25 | 6 | 60 | 34 |
| 13 | 0.25 | 0.25 | 0.5 | 6 | 60 | 34 |
| 14 | 0.45 | 0.1 | 0.45 | 2.38 | 45 | 52.62 |
| 15 | 0.5 | 0.25 | 0.25 | 2.38 | 45 | 52.62 |
| 16 | 0.25 | 0.5 | 0.25 | 2.38 | 45 | 52.62 |
| 17 | 0.25 | 0.25 | 0.5 | 2.38 | 45 | 52.62 |
| 18 | 0 | 0.5 | 0.5 | 6.62 | 45 | 48.38 |
| 19 | 0.45 | 0.45 | 0.1 | 6.62 | 45 | 48.38 |
| 20 | 0.45 | 0.1 | 0.45 | 6.62 | 45 | 48.38 |
| 21 | 0.45 | 0.45 | 0.1 | 4.5 | 23.8 | 71.7 |
| 22 | 0.45 | 0.1 | 0.45 | 4.5 | 23.8 | 71.7 |
| 23 | 0.25 | 0.25 | 0.5 | 4.5 | 23.8 | 71.7 |
| 24 | 0 | 0.5 | 0.5 | 4.5 | 66.2 | 29.3 |
| 25 | 0.45 | 0.1 | 0.45 | 4.5 | 66.2 | 29.3 |
| 26 | 0.5 | 0.25 | 0.25 | 4.5 | 66.2 | 29.3 |
| 27 | 0.25 | 0.5 | 0.25 | 4.5 | 66.2 | 29.3 |
| 28 | 0.45 | 0.45 | 0.1 | 4.5 | 45 | 50.5 |
| 29 | 0.45 | 0.1 | 0.45 | 4.5 | 45 | 50.5 |
| 30 | 0 | 0.5 | 0.5 | 4.5 | 45 | 50.5 |
| 31 | 0.5 | 0.25 | 0.25 | 4.5 | 45 | 50.5 |
| 32 | 0.267 | 0.37 | 0.367 | 4.5 | 45 | 50.5 |

The resulting mesophase-stabilized emulsions were tested rheologically for yield stress (Haake VT 550) and viscosity (Bohlin Visco 88), and for stability under centrifugation at 100,000×G for 30 min. Stability of the emulsion was estimated by the percentage of oil and/or water released under centrifugation. The percent of total emulsion is the amount of mesophase-stabilized emulsion, subjected to centrifugation, which remains after centrifugation and does not break into oil and aqueous phases, or an oil emulsion phase and a mesophase gel phase. The oil droplet size was estimated by light microscopy. The results are shown in the following Table II.

TABLE II

Rheological and Stability Results.

| Sample | Rheological Measurements | | Centrifugation Studies | | | Oil Droplet Size Range (microns) |
|---|---|---|---|---|---|---|
| | Yield Stress (τ[Pa]) | Viscosity (Pas at 50/sec) | % Water out | % Oil out | % Emulsion | |
| 1 | 1.7 | 0.238 | 6.6 | 0 | 32.432 | 2–6.5 |
| 2 | 231 | 1.549 | 38.137 | 0 | 30.958 | 2–6.5 |
| 3 | 127 | 1.18 | 32.985 | 0 | 35.38.1 | 2.5–8.9 |
| 4 | 81.2 | 3.17 | 1.963 | 0 | 83.536 | 1.3–5.0 |
| 5 | 307 | 2.589 | 50.386 | 0 | 58.112 | 2.0–7.0 |
| 6 | 53.1 | 1.585 | 1.956 | 0 | 74.092 | 1.3–5.0 |
| 7 | 209 | 3.4 | 0 | 0 | 100 | 1.0–2.5 |
| 8 | 446 | 5.2 | 11.517 | 0 | 42.752 | 1.3–6.4 |
| 9 | 454 | 4.6 | 9.554 | 0 | 32.432 | 1.9–5.1 |
| 10 | 590 | 16.6 | 0 | 0 | 100 | 1.0–2.5 |
| 11 | | | Emulsion Broke | | | |
| 12 | 716 | 9.616 | 20.717 | 0 | 92.956 | 1.2–3.8 |
| 13 | 679 | 13.4 | 2.719 | 0 | 99.075 | 1.2–3.8 |
| 14 | 23.9 | 1.378 | 38.099 | 0 | 51.551 | 2.5–7.7 |
| 15 | 124 | 1.665 | 51.25 | 0 | 44.391 | 2.5–11.5 |
| 16 | 43 | 1.692 | 56.693 | 0 | 47.255 | 2.0–10.0 |
| 17 | 15.5 | 1.221 | 24.843 | 0 | 47.942 | 2.5–7.7 |
| 18 | 455 | 6.504 | 0 | 0 | 100 | 1.2–3.8 |
| 19 | 381 | 6.408 | 42.149 | 0 | 51.597 | 1.2–4.6 |
| 20 | 373 | 4.84 | 0 | 0 | 100 | 1.9–4.5 |

TABLE II-continued

Rheological and Stability Results.

| | Rheological Measurements | | Centrifugation Studies | | | |
|---|---|---|---|---|---|---|
| Sample | Yield Stress (τ[Pa]) | Viscosity (Pas at 50/sec) | % Water out | % Oil out | % Emulsion | Oil Droplet Size Range (microns) |
| 21 | 291 | 3.5 | 34.422 | 0 | 33.414 | 2.5–7.7 |
| 22 | 92.5 | 3.419 | 0 | 0 | 36.855 | 2.5–5.2 |
| 23 | 73.4 | 3.592 | 0 | 0 | 36.32 | 2.5–5.2 |
| 24 | 474 | 1.131 | 0 | 0 | 100 | 1.2–2.5 |
| 25 | 310 | 10.01 | 0 | 0 | 100 | 1.2–5 |
| 26 | | | Emulsion broke | | | |
| 27 | 529 | 6.944 | 29.088 | 0 | 91.48 | 1.2–3.2 |
| 28 | 368 | 3.934 | 53.124 | 0 | 73.171 | 2.5–6.4 |
| 29 | 162 | 4.515 | 0 | 0 | 100 | 2.5–7 |
| 30 | 168 | 4.499 | 0 | 0 | 100 | 2.5–5 |
| 31 | 307 | 4.722 | 20.072 | 0 | 82.906 | 2.5–6.4 |
| 32 | 304 | 3.359 | 0 | 0 | 100 | 2.5–5.1 |

The results presented in Table II suggest that certain of these samples are especially stable and, thus, beneficial for use in food products. Although the system is complex, certain tendencies can be discerned. For instance, mesophase-stabilized emulsion samples 10, 12 and 13 all appear to be especially useful for use in spreads, cream cheese products and the like. Each of these samples maintain a relatively high percentage emulsion upon centrifugation, display little or no separation of oil phase or aqueous phase upon centrifugation, and have yield stresses ranging from about 590 to 720 τ[Pa]. These characteristics indicate the food products prepared with these stabilized emulsions would be very stable and should have the desired consistency as a spread.

Likewise, mesophase-stabilized emulsion samples 7, 29, 30 and 32 all appear to be especially suitable for use in spoonable dressings, whipped toppings, whipped desserts, sour cream products and the like. Again, each of these samples maintain a high percentage emulsion upon centrifugation, display no separation of aqueous phase or oil phase upon centrifugation, and have yield stresses ranging from about 160–300 τ[Pa] upon centrifugation at 100,000×G for 30 minutes. These characteristics indicate the food products prepared with these stabilized emulsions would be very stable and should have the desired consistency as a spoonable dressing.

Mesophase-stabilized emulsion samples 4 and 6 appear to be especially suitable for sauces and pourable dressings. A substantial amount of the original mesophase-stabilized emulsion remains after centrifugation, little or no aqueous phase or oil phase are formed upon centrifugation, and the resulting yield stresses range between 50 and 85, making these emulsions more desirable for use in sauces and pourable dressings.

As demonstrated in this Example, mesophase-stabilized emulsions can be prepared having properties suitable for many different type food products. As those skilled in the art will realize, variations in the emulsifiers, ratios of emulsifier, amount of total emulsifiers and the like can be varied to provide a variety of mesophase-stabilized emulsion for use in food products. Some of these food products are illustrated in the Examples that follow. Of course, other variations and food products can be utilized.

EXAMPLE 3

Mayonnaise-type Spoonable Dressing Prototypes Made with Mesophase Emulsions.

Emulsions from Example 2 were used to prepare mayonnaise dressing products using the following formula:

| Ingredients | % | Wt. (g) |
|---|---|---|
| Mesophase emulsion | 92.63 | 277.9 |
| Salt | 1.65 | 4.95 |
| Sugar | 0.637 | 1.91 |
| Vinegar (120 grains) | 2.5 | 7.5 |
| Salted liguid yolk | 2.5 | 7.5 |
| Total | 100 | 300 |

Using a food processor, the mesophase emulsion was mixed at low speed. The salt and sugar were added next and mixed for 1 minute. Vinegar was then added; salted egg yolks were added last. The emulsion was stored at room temperature. The mayonnaise dressing products were tested after 24 hr. for stability and rheology. Yield stress τ(Pa) was determined with a Haake VT 550 rheometer and viscosity (Pas) was measured at 50 sec$^{-1}$ with a Bohlin Visco 88 viscometer. Stability was determined by a centrifugation test (100,000×G for 30 min.). Released oil, released water, and total emulsion were measured. The results are shown in Table III below. Sample numbers correspond to the mesophase-stabilized emulsions described in Example 2.

TABLE III

Mayonnaise-type Spoonable Dressing Prototypes.

| Sample | % Water Released | % Oil Released | % Emulsion | Yield Stress τ[Pa] | Viscosity at 50/sec(Pas.) |
|---|---|---|---|---|---|
| 1 | 66.856 | 24.213 | 23.244 | 78.8 | 1.146 |
| 2 | 29.032 | 0 | 32.918 | 63.3 | 1.224 |
| 3 | 22.003 | 9.828 | 32.432 | 62.7 | 1.069 |
| 4 | 73.945 | 0 | 59.564 | 94.3 | 2.61 |
| 5 | 54.313 | 2.421 | 47.942 | 141 | 2.78 |
| 6 | 81.798 | 48.426 | 20.339 | 117 | 2.008 |
| 7 | 47.987 | 0 | 31.695 | 104 | 2.203 |
| 8 | 42.082 | 0 | 31.421 | 241 | 2.597 |
| 9 | 29.02 | 0 | 31.421 | 148 | 2.02 |

TABLE III-continued

Mayonnaise-type Spoonable Dressing Prototypes.

| Sample | % Water Released | % Oil Released | % Emulsion | Yield Stress τ[Pa] | Viscosity at 50/sec(Pas.) |
|---|---|---|---|---|---|
| 10 | 68.648 | 0 | 61.917 | 74 | 4.684 |
| 11 | | | Emulsion Broke | | |
| 12 | 67.651 | 0 | 76.998 | 363 | 4.675 |
| 13 | 71.924 | 0 | 75.545 | 90.1 | 3.828 |
| 14 | 63.038 | 90.396 | 23.244 | 59.1 | 0.747 |
| 15 | 57.517 | 48.426 | 26.15 | 45.4 | 0.8662 |
| 16 | 43.712 | 0 | 50.848 | 39.4 | 0.9541 |
| 17 | 43.712 | 67.797 | 15.98 | 70.4 | 0.9403 |
| 18 | 55.05 | 0 | 73.366 | 136 | 2.8 |
| 19 | 49.709 | 0 | 53.165 | 106 | 2.426 |
| 20 | 46.72 | 0 | 77.369 | 321 | 4.687 |
| 21 | 62.118 | 0 | 19.636 | 106 | 1.488 |
| 22 | 60.16 | 44.0267 | 46.384 | 268 | 2.207 |
| 23 | 56.19 | 0 | 59.705 | 181 | 1.84 |
| 24 | 75.771 | 0 | 77.806 | 105 | 5.678 |
| 25 | 74.654 | 60.117 | 38.329 | 195 | 2.932 |
| 26 | | | Emulsion Broke | | |
| 27 | 58.69 | 0 | 69.734 | 286 | 5.623 |
| 28 | 29.09 | 0 | 50.123 | 132 | 2.302 |
| 29 | 49.138 | 19.656 | 45.7 | 249 | 2.946 |
| 30 | 53.517 | 0 | 50.123 | 107 | 2.454 |
| 31 | 29.09 | 9.828 | 45.7 | 175 | 2.194 |
| 32 | 52.057 | 0 | 45.7 | 201 | 2.416 |

As can be seen from Table III, mayonnaise dressing products formed from mesophase-stabilized emulsions prepared as described in Examples 2 and 3 using the formulae of Table 1, when subjected to centrifugation at 100,000×G for 30 minutes, differ in their stabilities and rheological characteristics. On the basis of these results, formula(s) from Table I can be selected which provide mesophase-stabilized emulsions which display desirable characteristics upon harsh treatment (such as centrifugation). Such mesophase-stabilized emulsions should display similar characteristics when incorporated into food products. Thus, such products should be stable when stored at room temperature for relatively long periods of time.

EXAMPLE 4

Mesophase-Stabilized Emulsions and Use in Products.

A three-emulsifier mesophase-stabilized emulsion system was prepared with 5% total emulsifiers, and 47.5% soybean oil as follows:

| Tank #1 | Tank #2 |
|---|---|
| 96 lb. Water | 95 lb. soybean oil |
| 3.32 lb. SSL | 3.32 lb. DATEM |
| | (70/30 blend of DATEM/MG) |
| | 3.32 lb. Distilled MG |

SSL was dispersed in water in Tank #1 at 25° C. with constant stirring with a Lightnin™ Mixer. The other two emulsifiers (DATEM and MG) were dispersed in soybean oil in Tank #2, which was then heated to 90° C. with constant mixing. The hot oil from Tank #2 was then mixed into the aqueous phase in Tank #1 to form a coarse emulsion. The temperature of the coarse emulsion was maintained at about 42 to about 46° C. The coarse emulsion was then homogenized by pumping through a shear device (Pentax Mixer™) at its maximum speed. The emulsion was collected, cooled and stored at refrigerated temperature for further use.

The cooled mesophase-stabilized emulsion was used to prepare various flavored spoonable dressing prototypes according to the following base formula:

| Ingredients | % |
|---|---|
| Mesophase-Stabilized Emulsion | 92.63 |
| Sugar | 0.635 |
| Salt | 1.65 |
| Vinegar | 2.5 |
| Salted Egg Yolk | 2.5 |

The following prototypes were prepared:

No. 1—Model formula (as above, no spices), egg yolk was added as last ingredient.

No. 2—Complete formula (with Mayonnaise spices including onion, garlic, black pepper, lemon juice and paprika), egg yolk was added first.

No. 3—Complete formula (with Mayonnaise spices), except no egg yolk

No. 4—Same as 3, with added cracked Mexican oregano and minced green onion

No. 5—Same as 3, with added thyme leaves, minced garlic and puffed carrot granules No. 6—Model formula with no eggs with the following seasoning blends.
  a) Southwest seasoning
  b) Lemon Herb, Oregano and basil
  c) Bayou Cajun, and ground red pepper No. 7—Model formula, ½ of the eggs (no spices).

Each of these products had excellent flavor delivery. Prototypes 4, 5, and 6 indicate that the mesophase-stabilized emulsion is useful in delivering impact or strong flavors as well as the more mild, mayonnaise-type flavors. All formulas were stable over several months and retained their full fat mouthfeel during, this storage period.

EXAMPLE 5

Formation of Mesophase Gel and Use of Such Gel to Formulate Spoonable Dressing.

Five hundred grams of mesophase gel was prepared using the emulsifiers in dry powder form (2.85% DATEM/MG, 2.85% MG, 3.8% SSL). The emulsifiers were blended and sifted into room temperature water with stirring. The emulsifiers dispersed in water were heated gradually with stirring to about 65° C. and maintained at that temperature with stirring for about 5 to 10 minutes. During heating, the mixture thickened and became gelatinized. While the mixture was held at about 65° C., the mesophase gel became thinner in consistency. The mesophase gel was then set at 5° C. and stored overnight. After cooling, the gel thickened to the consistency of sour cream (yield stress of 200–400 τPA).

The mesophase gel was used to formulate spoonable dressings as described below. The overall formula for these spoonable dressings is as follows:

| Ingredient | % | Wt. (g) |
|---|---|---|
| Mesophase gel | 48.4 | 145.9 |
| Soybean oil | 43.8 | 132.0 |
| Salted egg yolk | 2.5 | 7.5 |
| Salt | 2.1 | 6.5 |

-continued

| Ingredient | % | Wt. (g) |
| --- | --- | --- |
| Sugar | 0.6 | 1.9 |
| Vinegar | 2.5 | 7.5 |

The mesophase gel was placed in a conventional food processor. Oil was added with moderate shear, forming a mesophase-stabilized emulsion with the consistency of a spoonable dressing. Salted egg yolk was added with stirring, followed by salt and sugar, and, finally, vinegar. The consistency of the resulting dressing was that of a spoonable dressing. It could not be put through a colloid mill. It appeared stable and when set at room temperature, it remained stable for two weeks, at which time it underwent synthesis as evidenced by the separation of water from the emulsion.

EXAMPLE 6

Mesophase Emulsion Formulated with 45% Oil.

A mesophase emulsion was prepared as follows: The preparation was carried out at pilot plant scale (150 lb. batch). Three emulsifiers (DATEM, SSL, and MG) were dry blended and then dispersed in water using a tank with a surface scraper and overhead mixer. The emulsifier dispersion was heated using steam through the tank jacket to 85–90° C. and held for 10–20 minutes at that temperature. The emulsifier solution was cooled to 45–50° C. with mixing, and then cooled at refrigeration temperatures (with no mixing) overnight for the gel to set. The gel was used to form a 45% oil mesophase-stabilized emulsion. The mesophase gel (55 g) was added to 45 g of oil with stirring to create a coarse emulsion. The coarse emulsion was subjected to high shear through a Pentax™ mixer at about 25,000 sec$^{-1}$, resulting in a mesophase-stabilized emulsion.

EXAMPLE 7

Thousand Island Pourable Salad Dressing.

A salad dressing was prepared with the following formulae:

| Emulsion (Composition A): | | |
| --- | --- | --- |
| Ingredients | % | Wt (g) |
| Mesophase Emulsion | 30 | 300 |
| Water | 17.39 | 174 |
| Sugar Sol. (66.5%) | 19.4 | 194 |
| Vinegar 120 Grain | 3.133 | 31 |
| Salt | 1.7 | 17 |
| Spice Blend | 0.5 | 5 |

Blending of A: In a Hobart™ mixer at medium speed, the 45% oil mesophase emulsion formulated by Example 6 was added first, followed by dry ingredients (salt and spices) followed by sugar solution, vinegar and water.

| Ingredient | % | Wt (g) |
| --- | --- | --- |
| Relish | 11.4 | 114 |
| Tomato Paste (31% sol.) | 7.0 | 70 |
| Water | 6.3 | 63 |

-continued

| Ingredient | % | Wt (g) |
| --- | --- | --- |
| Vinegar 120 grain | 2.5 | 25 |
| Spices blend | 0.6 | 6 |

Composition B was prepared in Hobart™ mixer. Tomato paste, water & vinegar were blended first then followed by solid ingredients (relish and spices).

Both Compositions A and B were prepared separately and then were combined in a Hobart™ mixer using 27.8% Composition B and 72.1% Composition A. The resulting dressing had very favorable organoleptic attributes, i.e., it had a creamy mouthfeel and good lubricity.

EXAMPLE 8

Pilot Plant Scale Production of Meosphase Gel and Emulsion.

Mesophase gel and emulsion were prepared at pilot plant scale (150 lb. batch). Three emulsifiers (DATEM, SSL, and MG) were dry blended and then dispersed in water using a tank with a surface scraper and overhead mixer. The (emulsifier dispersion was heated using steam through the tank jacket to about 85–90° C. and held for 10–20 minutes at that temperature. The emulsifier solution was cooled to 45–50° C. with mixing, and then cooled at refrigeration temperatures (with no mixing) overnight for the gel to set. The mesophase gel contained about 2.8 percent DATEM, about 2.8 percent MG, and about 3.8 percent SSL. The gel was divided into two portions. The first portion (Batch #1) (~50 lb.) was homogenized (no added oil) through a high shear Pentax™ homogenizer at a shear rate of 25,000 sec$^{-1}$. The second portion (Batch #2) was mixed with soybean oil in a 9/1 ratio of mesophatse gel to soybean oil. In a tank with overhead mixing the mesophase gel was mixed at a medium speed. The soybean oil was added slowly to the gel with mixing to form a coarse emulsion. After all the oil was added, the coarse emulsion was homogenized through the Pentax™ homogenizer at a rate of 25,000 sec$^{-1}$.

The following are selected examples of food prototypes formulated with the mesophase of this invention illustrate their use in a wide range of applications and food products. As those skilled in the art will realize, the mesophase compositions of this invention may be used in other food products as well.

EXAMPLE 9

Raspberry Dip.

The dip was prepared al bench scale in a Hobart™ mixer. Mesophase emulsion (Batch #2, 10% oil) from Example 8, was added; then the raspberry syrup and the remainder of the ingredients were added. The ingredients were mixed in a Hobart™ mixer. The formula is presented in the following table:

| Ingredient | Wt (g) | % |
| --- | --- | --- |
| Mesophase emulsion (10% oil) | 500 | 59.3 |
| Raspberry Syrup | 100 | 11.8 |
| Cinnamon | 2.0 | 0.23 |
| Brown sugar | 70 | 8.3 |
| Lemon Juice | 80 | 0.95 |
| Nutmeg | 1.0 | 0.11 |
| Raspberry Juice Concentrate | 10 | 1.2 |

-continued

| Ingredient | Wt (g) | % |
|---|---|---|
| Xanthan | 1.0 | 1.2 |
| Mesophase (0.0% oil) | 150 | 17.8 |

The mesophase gel (0% oil) was added at the end of the process to improve the texture of the food product. The product demonstrated excellent mouthfeel and flavor impact.

EXAMPLE 10
Low-fat Salad Dressing Sandwich Spread.

A low-fat salad dressing sandwich spread was prepared using the following ingredients:

| Ingredients | % | Wt (g) |
|---|---|---|
| Mesophase Emulsion (10% Soybean Oil) | 47 | 470 |
| Salt | 1.13 | 11.3 |
| Sugar | 8.0 | 80 |
| Spices | 0.4 | 4.0 |
| Vinegar 120 Grains | 5.7 | 57 |
| Corn Starch | 3.9 | 39 |
| Water | 33.7 | 337 |

The same mesophase emulsion prepared in Example 8 (Batch #2) was used in this Example. The product was prepared in a Hobart™ mixer. The starches were prehydrated into a paste in the water with heating (as in conventional salad dressing formulations) prior to incorporation into the product. The final product has a consistency and mouthfeel comparable to full fat salad dressing.

EXAMPLE 11
Fat-Free Mayonnaise Using a Mesophase Gel.

A fat-free mayonnaise was prepared using a meosphase gel of the invention. A mesophase gel was prepared as in Example 8—Batch #1. In a Hobart™ mixer at a medium speed, the mesophase gel was added first, the salt and sugar were mixed in (3–5 minutes mixing), followed by vinegar and then egg yolk. The product was stored in glass jars. When evaluated, the product has a consistency, mouthfeel and taste superior to typical fat free mayonnaise.

EXAMPLE 12
Preparation of Mesophase-Stabilized Emulsion Containing 30% Oil in Pilot Plant.

Preparation of mesophase was carried out in pilot plant as follows:

| Tank #1 (water phase) | | Tank #2 (oil phase) | |
|---|---|---|---|
| Ingredient | wt (lb.) | Ingredient | wt (lb.) |
| Water | 128 | Soybean oil | 75 |
| SSL | 2.4 | DATEM | 6 |
| | | MG | 6 |

Procedure: In tank #1 water was added at room temperature. SSL was dispersed in the water and mixed with an overhead mixer. In tank #2, soybean oil was added and blended with the two emulsifiers to form an oil emulsifier phase. The oil emulsifier phase was heated to about 83–85° C. and held at that temperature until the emulsifiers were completely melted. 69.6 lb. of the oil emulsifier phase was then added slowly to the water phase in tank #1 to form a coarse mesophase emulsion at 42–45° C. The coarse emulsion was then homogenized through a Pentax™ homogenizer at shear rate 25,000 sec$^{-1}$ and then stored under refrigeration.

| Final Composition of Mesophase Emulsion | | |
|---|---|---|
| Ingredient | % | wt (lb.) |
| Water | 64 | 128 |
| SSL | 1.2 | 2.4 |
| DATEM | 2.4 | 4.8 |
| MG | 2.4 | 4.8 |
| Soybean oil | 30 | 60 |

EXAMPLE 13
Sour Cream Basil Dip.

A sour cream basil dip containing mesophase was prepared using the following formula:

| Ingredient | % | Wt (g) |
|---|---|---|
| Mesophase emulsion | 91.7 | 917 |
| Salt | 1.3 | 13 |
| Vinegar | 1.5 | 15 |
| Dairy Flavors | 5 | 50 |
| Spices (including Basil) | 0.5 | 5 |

The mesophase emulsion was prepared as in Example 12. The mesophase emulsion was prepared in a pilot plant. The mesophase emulsion was added to a Hobart™ mixer with gentle mixing. The dry ingredients were then added with mixing. Finally the vinegar was mixed in. The product was flavorful with a distinct dairy flavor, an excellent texture and satisfying mouthfeel.

EXAMPLE 14
Comparison of A One Step Continuous Process for 3-Emulsifier Mesophase and Use in Low-Fat Mayonnaise and Salad Dressings and a Two Step Batch Process.

In this example, two mayonnaise-type spoonable dressings were made with the same final compositions but using two different processes.

Product 1 was made in a two-step process similar to the procedure described in Example 5. In this process, DATEM, MG and SSL were blended in the ratio of 30:30:60 and dispersed in water to give the following composition:

| Ingredient | % |
|---|---|
| DATEM | 2.85 |
| MG | 2.85 |
| SSL | 3.8 |
| Water | 90.5 |
| Total | 100 |

The emulsifiers were heated to 85° C. under agitation and held at this temperature for 20 minutes. This gel was then cooled to 57–58° C. under agitation then stored at 7° C. for 16 hours. Oil was added to a predetermined amount of the gel under agitation resulting in a final oil level of 38% in the coarse emulsion. All flavor ingredients were added to the emulsion and blended in a propeller type mixer for 10 minutes. The coarse emulsion was then passed through a shearing device/colloid mill at 25,000 sec$^{-1}$ The product was stored at 22° C.

Product 2 was made in a one-step process by melting the emulsifiers in water (same ratios, time and temperature as described above). The gel was cooled down to 10–15° C. by recirculating between a double jacketed tank and a shell in tube heat exchanger. A check valve was installed in the shell in tube heal exchanger to ensure good back pressure and efficient cooling. To the cooled gel, oil was added to get a final oil level of 38% in the emulsion. All flavor ingredients were added to the coarse emulsion and the emulsion was processed as above. The product was stored at 22° C.

The compositions of both finished products were as follows:

| Ingredient | % |
| --- | --- |
| Moisture | 58.7 |
| Acid | 0.9 |
| Fat | 33.4 |
| Salt | 2.2 |

The viscosities of the two products were tracked over a period of 2 weeks; the viscosities of both products were similar as a function of time.

| Product | Immediately After processing | 24 Hours | 1 Week | 2 Weeks |
| --- | --- | --- | --- | --- |
| 1 (two step) | 86.6 | 81.1 | 119 | 138 |
| 2 (one step) | 83.3 | 89.85 | 113 | 146 |

What is claimed is:

1. A mesophase-stabilized composition for use in low-fat and fat-free food products comprising an emulsifier mixture and an aqueous phase;
   wherein the emulsifier mixture comprises about 1 to about 40 percent of a first emulsifier which has an HLB of between about 6 and about 9, about 20 to about 60 percent of a second emulsifier which has an HLB of between about 2 and about 6, and about 10 to about 60 percent of a third emulsifier which has an HLB of between about 9 and about 22.

2. The mesophase-stabilized composition as defined in claim 1, wherein the mesophase-stabilized composition is a dispersion for use in fat-free food products.

3. The mesophase-stabilized composition as defined in claim 2, wherein the first emulsifier is a diacetyl tartaric acid ester of a monoglyceride.

4. The mesophase-stabilized composition as defined in claim 2, wherein the second emulsifier is a monoglyceride.

5. The mesophase-stabilized composition as defined in claim 2, wherein the third emulsifier is sodium stearoyl lactylate.

6. The mesophase-stabilized composition as defined in claim 1, wherein the mesophase-stabilized composition further comprises an oil phase and wherein the mesophase-stabilized composition is for use in low-fat food products.

7. The mesophase-stabilized composition as defined in claim 6, wherein the first emulsifier is a diacetyl tartaric acid ester of a monoglyceride.

8. The mesophase-stabilized composition as defined in claim 6, wherein the second emulsifier is a monoglyceride.

9. The mesophase-stabilized composition as defined in claim 6, wherein the third emulsifier is sodium stearoyl lactylate.

10. A method for making a mesophase-stabilized composition for use in low-fat or fat-free food products, said method comprising the steps, in order,
    (a) heating an aqueous emulsifier phase to between about 45° C. to about 90° C., wherein the aqueous emulsifier phase comprises an emulsifier mixture added to an aqueous phase, wherein the emulsifier mixture comprises about 1 to about 40 percent of a first emulsifier which has an HLB of about 6 to about 9, about 20 to about 60 percent of a second emulsifier which has an HLB of 2 to about 6, and about 10 to about 60 percent of a third emulsifier which has an HLB of about 9 to about 22;
    (b) cooling the aqueous emulsifier phase to a temperature of about 40° C. to about 60° C.; and
    (c) further cooling the aqueous emulsifier phase to a temperature of about 2° to about 8° to form a mesophase-stabilized composition.

11. The method as defined in claim 10, wherein the mesophase-stabilized composition is a dispersion for use in fat-free food products.

12. The method as defined in claim 11, further comprising adding oil to the mesophase-stabilized composition and treating the oil-containiig mesophase-stabilized composition with shear of about 5000 sec$^{-1}$ to about 50,000 sec$^{-1}$ to form a mesophase-stabilized emulsion.

13. The method as defined in claim 11, wherein the cooling steps of the aqueous emulsifier phase are effected by passing the products of steps (a) or (b) through a heat exchanger.

14. The method as defined in claim 11, wherein the first emulsifier is a diacetyl tartaric acid ester of a monoglyceride.

15. The method as defined in claim 11, wherein the second emulsifier is a monoglyceride.

16. The method as defined in claim 11, wherein the third emulsifier is sodium stearoyl lactylate.

17. A mesophase-stabilized composition for use in low-fat food products comprising an emulsifier composition, an oil phase and an aqueous phase;
    wherein the emulsifier composition comprises about 1 to about 40 percent of a first emulsifier which has an HLB of between about 6 and about 9, about 20 to about 60 percent of a second emulsifier which has an HLB of between about 2 and about 6, and about 10 to about 60 percent of a third emulsifier which has an HLB of between about 9 and about 22.

18. The mesophase-stabilized composition as defined in claim 17, wherein the mesophase-stabilized composition is an emulsion.

19. The mesophase-stabilized composition as defined in claim 17, wherein the first emulsifier is a diacetyl tartaric acid ester of monoglyceride.

20. A method for making a mesophase-stabilized composition for use in low-fat food products, said method comprising the steps of
    (a) adding a first emulsifier which has an HLB of about 6 to about 9 and a second emulsifier which has an HLB of about 2 to about 6 to an oil phase and mixing with heat to form an oil emulsifier phase;
    (b) adding a third emulsifier which has an HLB of about 9 to about 22 to an aqueous phase and mixing to form an aqueous emulsifier phase;
    (c) mixing the oil emulsifier phase and the aqueous emulsifier phase to form a coarse emulsion;

(d) subjecting the coarse emulsion to shear in a range of about 5000 sec$^{-1}$ to about 50,000 sec$^{-1}$ to form a mesophase-stabilized emulsion; and (e) cooling the mesophase-stabilized emulsion to a temperature between about 2° C. to about 10° C.;
   wherein the mesophase-stabilized composition contains, based in the total weight of the first, second and third emulsifiers, about 1 to about, 40 percent of the first emulsifier, about 20 to about 60 percent of the second emulsifier, and about 10 to about 60 percent of the third emulsifier.

21. The method as defined in claim 20, wherein the first emulsifier is a diacetyl tartaric ester of a monoglyceride.

22. The method as defined in claim 20, wherein the second emulsifier is a monoglyceride.

23. The method as defined in claim 22, wherein the third emulsifier is sodium stearoyl lactylate.

24. The method as defined in claim 20, wherein the mesophase-stabilized emulsion is cooled by passing said mesophase-stabilized emulsion through a heat exchanger to lower the temperature of the mesophase-stabilized emulsion.

25. A mesophase-stabilized composition for use in low-fat food products comprising an emulsifier mixture, an oil phase and an aqueous phase, made by the method comprising the steps, in order, (a) heating an aqueous emulsifier phase to between about 45° C. to about 90° C., wherein the aqueous emulsifier phase comprises an emulsifier mixture added to an aqueous phase, wherein the emulsifier mixture comprises about 1 to about 40 percent of a first emulsifier which has an HLB of between about 6 and about 9, about 20 to about 60 percent of a second emulsifier which has an HLB of between about 2 and about 6, and about 10 to about 60 percent of a third emulsifier which has an HLB of between about 9 and about 22;

(b) cooling the aqueous emulsifier phase to a temperature of between about 40° C. to about 60° C.;

(c) adding an oil phase, a spice, a preservative, and another food ingredient with mixing to form a coarse emulsion;

(d) subjecting the coarse emulsion to shear ranging from about 5000 sec$^{-1}$ to about 50,000 sec$^{-1}$ to yield a mesophase-stabilized composition; and (e) cooling said mesophase-stabilized composition to a temperature between about 2° C. to 10° C.

26. A mesophase-stabilized composition for use in low-fat food products made by the method defined in claim 25 wherein the first emulsifier is a diacetyl tartaric acid of monoglyceride.

27. A mesophase-stabilized composition for use in low-fat food products made by the method defined in claim 25 wherein the second emulsifier is a monoglyceride.

28. A mesophase-stabilized composition for use in low-fat food products made by the method as defined in claim 25 wherein the third emulsifier is sodium stearoyl lactylate.

29. A low-fat food product incorporating the mesophase-stabilized composition made by the method as defined in claim 25, wherein the food product is a dressing, a sauce a spread or a dip.

30. A mesophase-stabilized composition for use in low-fat food products as defined in claim 25 wherein said cooling step is effected by passing said aqueous emulsifier phase and said mesophase-stabilized composition through a heat exchanger to lower the temperature of said compositions.

* * * * *